(12) United States Patent
Minoura

(10) Patent No.: US 11,727,727 B2
(45) Date of Patent: Aug. 15, 2023

(54) INFORMATION PROCESSING APPARATUS

(71) Applicant: NEC Corporation, Tokyo (JP)

(72) Inventor: Kazuma Minoura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 140 days.

(21) Appl. No.: 17/277,529

(22) PCT Filed: Aug. 21, 2019

(86) PCT No.: PCT/JP2019/032670
§ 371 (c)(1),
(2) Date: Mar. 18, 2021

(87) PCT Pub. No.: WO2020/066374
PCT Pub. Date: Apr. 2, 2020

(65) Prior Publication Data
US 2022/0036051 A1 Feb. 3, 2022

(30) Foreign Application Priority Data
Sep. 25, 2018 (JP) .................. 2018-178790

(51) Int. Cl.
*G06V 40/20* (2022.01)
*G06V 10/25* (2022.01)
*G06V 20/30* (2022.01)

(52) U.S. Cl.
CPC .............. *G06V 40/23* (2022.01); *G06V 10/25* (2022.01); *G06V 20/30* (2022.01)

(58) Field of Classification Search
CPC ......... G06V 40/23; G06V 10/25; G06V 20/30
USPC ........................................... 382/103
See application file for complete search history.

(56) References Cited

U.S. PATENT DOCUMENTS

| 5,555,512 A | 9/1996 | Imai et al. |
| 2016/0342830 A1 | 11/2016 | Ariizumi et al. |
| 2019/0220673 A1* | 7/2019 | Ikeda ............... G06V 20/53 |

FOREIGN PATENT DOCUMENTS

| JP | H06-117836 A | 4/1994 |
| JP | 3453870 B2 * | 10/2003 |
| JP | 2016-085014 A | 5/2016 |
| JP | 2016-218610 A | 12/2016 |
| WO | 2018/051944 A1 | 3/2018 |

OTHER PUBLICATIONS

International Search Report for PCT Application No. PCT/JP2019/032670, dated Oct. 15, 2019.

* cited by examiner

*Primary Examiner* — Wednel Cadeau
(74) *Attorney, Agent, or Firm* — Sughrue Mion, PLLC

(57) ABSTRACT

An information processing apparatus according to the present invention includes: a detecting unit configured to detect a proportion of an existing person for each predetermined region; and a calculating unit configured to, on a basis of the proportion of the person in each predetermined region, calculate a value based on an amount of activity of the person.

7 Claims, 13 Drawing Sheets

INFORMATION PROCESSING APPARATUS

This application is a National Stage Entry of PCT/JP2019/032670 filed on Aug. 21, 2019, which claims priority from Japanese Patent Application 2018-178790 filed on Sep. 25, 2018, the contents of all of which are incorporated herein by reference, in their entirety.

TECHNICAL FIELD

The present invention relates to an information processing apparatus that measures the amount of activity of a person who exists in a predetermined region, an information processing method, and a program.

BACKGROUND ART

In order to make a space in a facility comfortable, in Patent Document 1, it is studied to control air conditioning in consideration of the movement of a person in the facility. To be specific, in Patent Document 1, the movement of a person is measured by the use of a sensor such as a laser device, and air conditioning is controlled based on the movement of the person. At this time, in Patent Document 1, by providing each person with identification information and tracking the person, the movement of the person is measured, and the amount of activity of the person is also measured based on the moving speed.

The amount of activity calculated based on the movement of a person stated above is useful information because it may be used not only for air conditioning control but also for various purposes. For example, it is possible to control lighting equipment in accordance with the amount of activity of a person, and it is also possible to use the amount of activity of a person for anomaly detection, security, and marketing.

Patent Document 1: Japanese Unexamined Patent Application Publication No. JP-A 2016-085014

However, with the technique of Patent Document 1 stated above, it is required to track a person in order to calculate the amount of activity and, if such tracking processing is difficult, it is impossible to calculate the amount of activity. For example, in a case where a large number of people exist and form a crowd or in a case where the accuracy of a sensor for detecting a person is low, it is difficult to detect and track individual persons.

SUMMARY

Accordingly, an object of the present invention is to provide an information processing apparatus which can solve the abovementioned problem that it is difficult to obtain the amount of activity of a person.

An information processing apparatus according to an aspect of the present invention includes: a detecting unit configured to detect a proportion of an existing person for each predetermined region; and a calculating unit configured to, on a basis of the proportion of the person in each predetermined region, calculate a value based on an amount of activity of the person.

Further, an information processing method according to another aspect of the present invention includes: detecting a proportion of an existing person for each predetermined region; and on a basis of the proportion of the person in each predetermined region, calculating a value based on an amount of activity of the person.

Further, a computer program according to another aspect of the present invention includes instructions for causing an information processing apparatus to realize: a detecting unit configured to detect a proportion of an existing person for each predetermined region; and a calculating unit configured to, on a basis of the proportion of the person in each predetermined region, calculate a value based on an amount of activity of the person.

With the configurations as described above, the present invention makes it possible to obtain the amount of activity of a person with ease.

EXAMPLE EMBODIMENTS

First Example Embodiment

Figure 1:
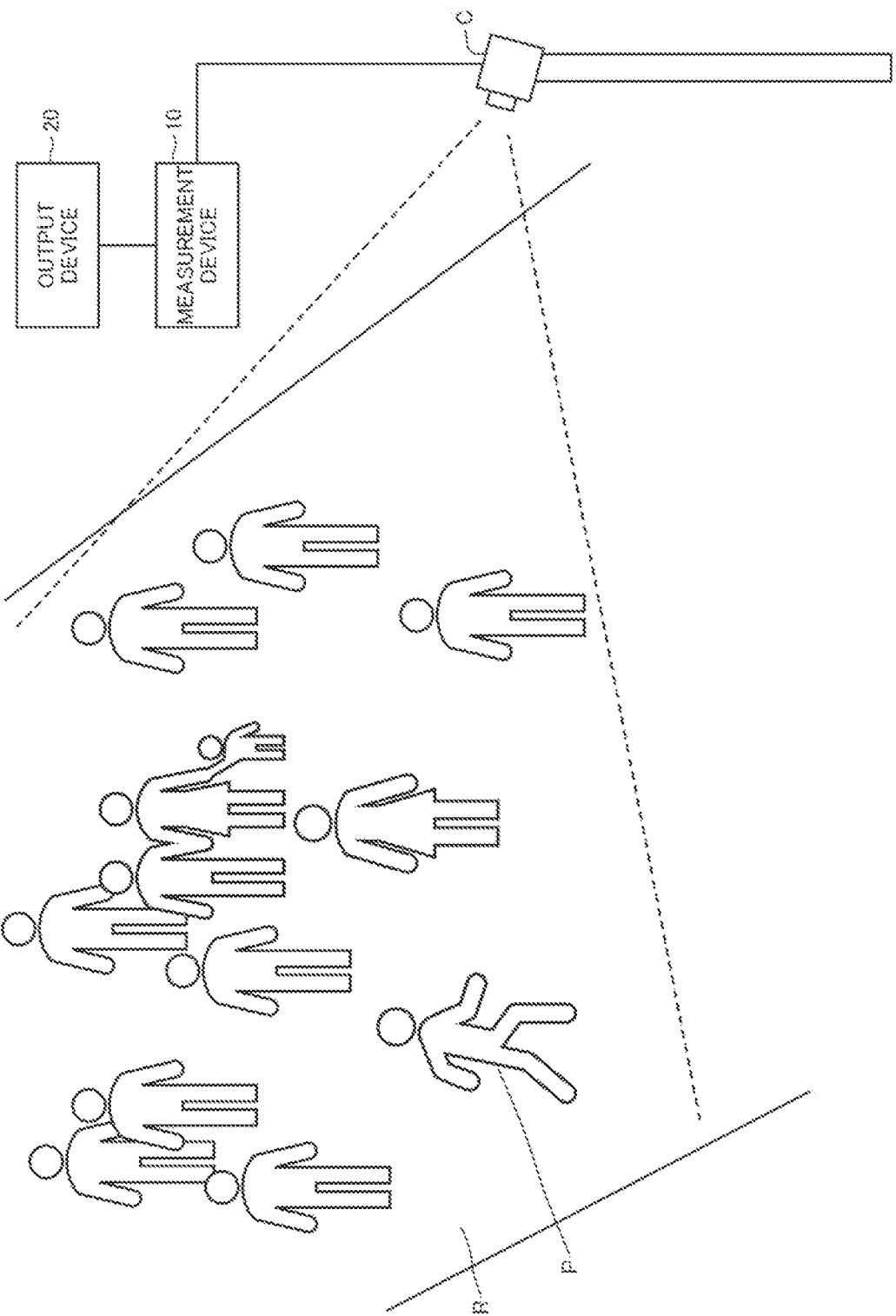
FIG. 1 is a view showing an entire configuration of an information processing system in a first example embodiment of the present invention.
Figure 2:
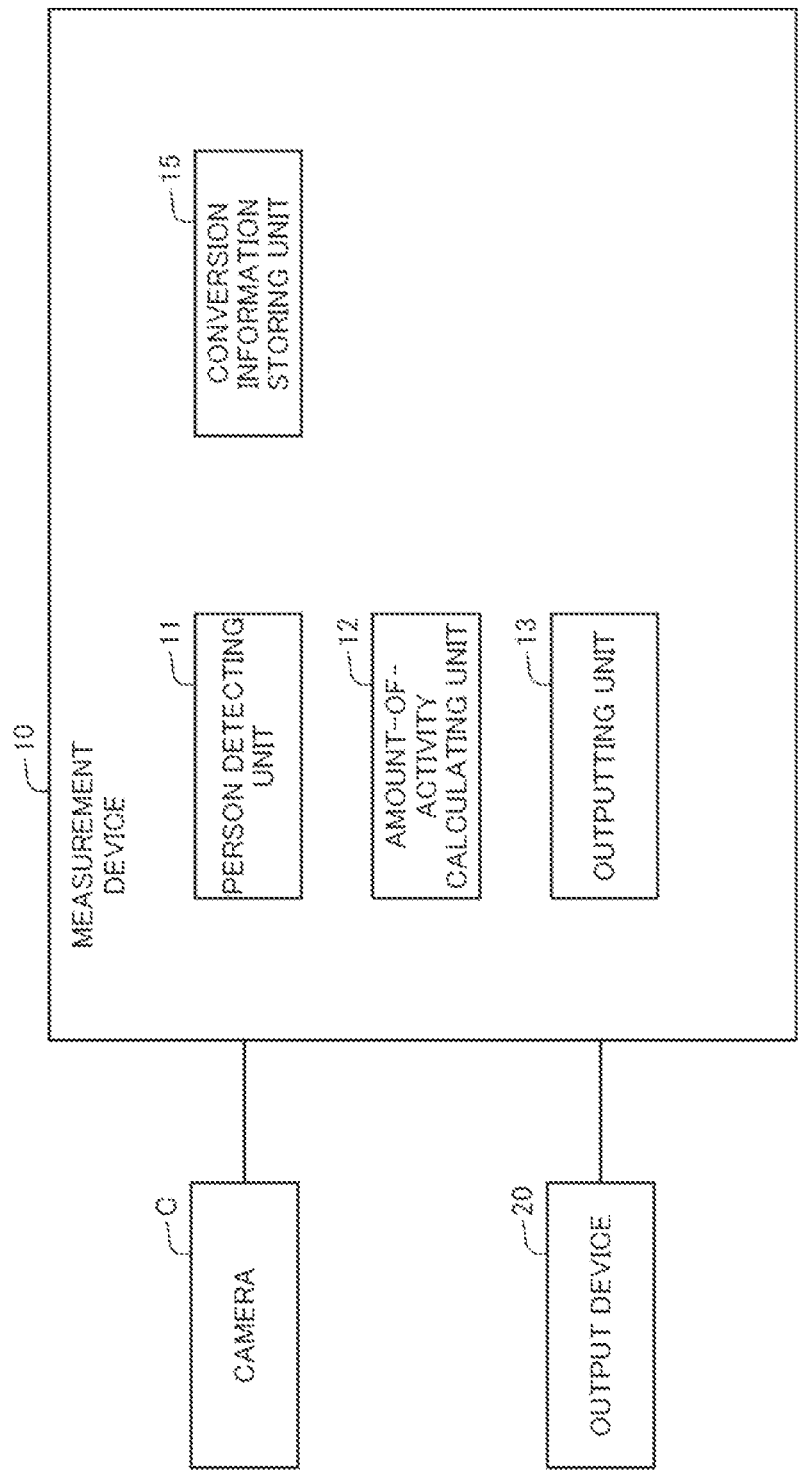
FIG. 2 is a block diagram showing a configuration of the information processing system in the first example embodiment of the present invention.
Figure 3:
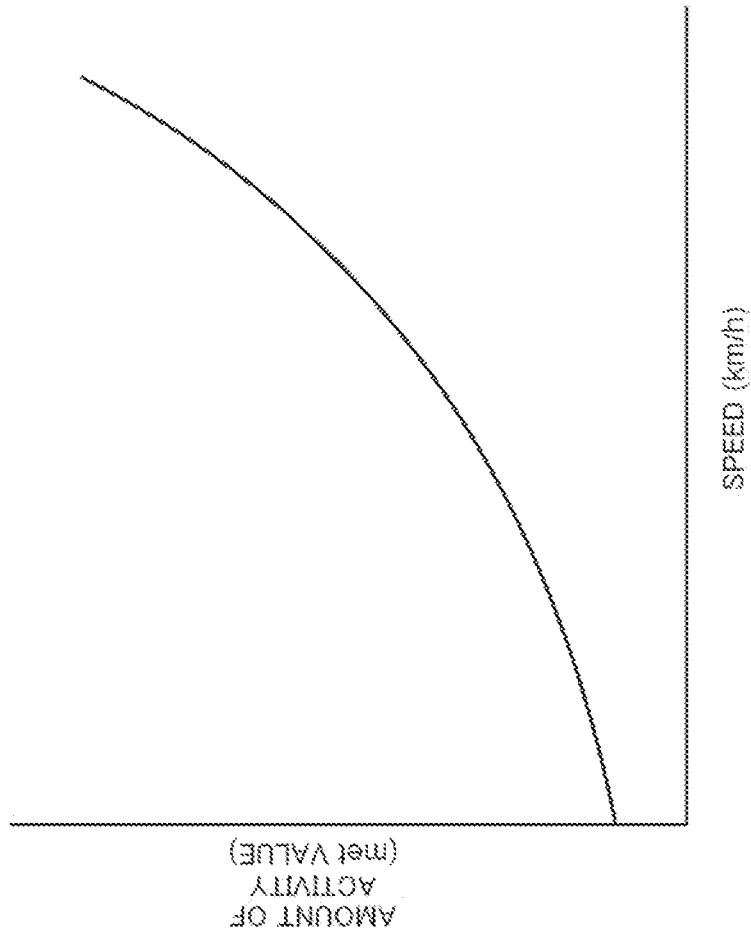
FIG. 3 is a view showing an example of a captured image by a camera disclosed in FIG. 1.

A first example embodiment of the present invention will be described with reference to FIGS. 1 to 12. FIGS. 1 to 3 are views for describing a configuration of an information processing system, and FIGS. 4 to 12 are views for describing a processing operation by the information processing system.

[Configuration]

The information processing system according to the present invention is a system used for calculating the amount of activity of a person P who exists in a target space R set indoors or outdoors and moreover using the amount of activity. As an example, the information processing system is used for calculating the amount of activity of a person who exists in a target room and controlling air conditioning in the room based on the amount of activity. Meanwhile, the calculated amount of activity may be used for any purpose; for example, used for controlling lighting in a target space, and may be used for anomaly detection, security, and marketing activity in a target space.

As shown in FIG. 1, the information processing system in this example embodiment includes a camera C for capturing an image of a target space, a measurement device 10 that calculates the amount of activity of a person in the space, and an output device 20 that outputs the calculated amount of activity. The measurement device 10 is configured by one or a plurality of information processing apparatuses each including an arithmetic logic unit and a storage unit. The output device 20 is configured by one or a plurality of information processing apparatuses each including an arithmetic logic unit and a storage unit, and further includes a display device. The display device is for displaying/outputting the amount of activity measured by the measurement device 10 as will be described later. In the following, a configuration of the measurement device 10 will be mainly descried in detail.

The measurement device 10 includes, as shown in FIG. 2, a person detecting unit 11, an amount-of-activity calculating unit 12 and an outputting unit 13 that are structured by the arithmetic logic unit executing a program. The measurement device 10 also includes a conversion information storing unit 15 formed in the storage unit.

First, in the conversion information storing unit 15, conversion information representing the relation between the moving speed and the amount of activity of the person P is stored as shown in FIG. 3. Conversion information is information in which a value of the mount of activity set in advance is stored in association with the value of a moving speed corresponding to the content of activity of the person P. For example, as shown in a table on the left side of FIG. 3, the amount of activity (a met value) is set so as to correspond to a moving speed (km/h) due to the activity of the person P, and information shown in a graph on the right side of FIG. 3 that is obtained by linearly interpolating the relationship between the moving speed and the amount of activity is stored as conversion information. In this example embodiment, the unit "met (Medical Evangelism Training & Strategies) value" representing the intensity of physical activity is used as the amount of activity, but the amount of activity of the person P may be expressed in any unit. How the conversion information is used will be described later.

Figure 4:
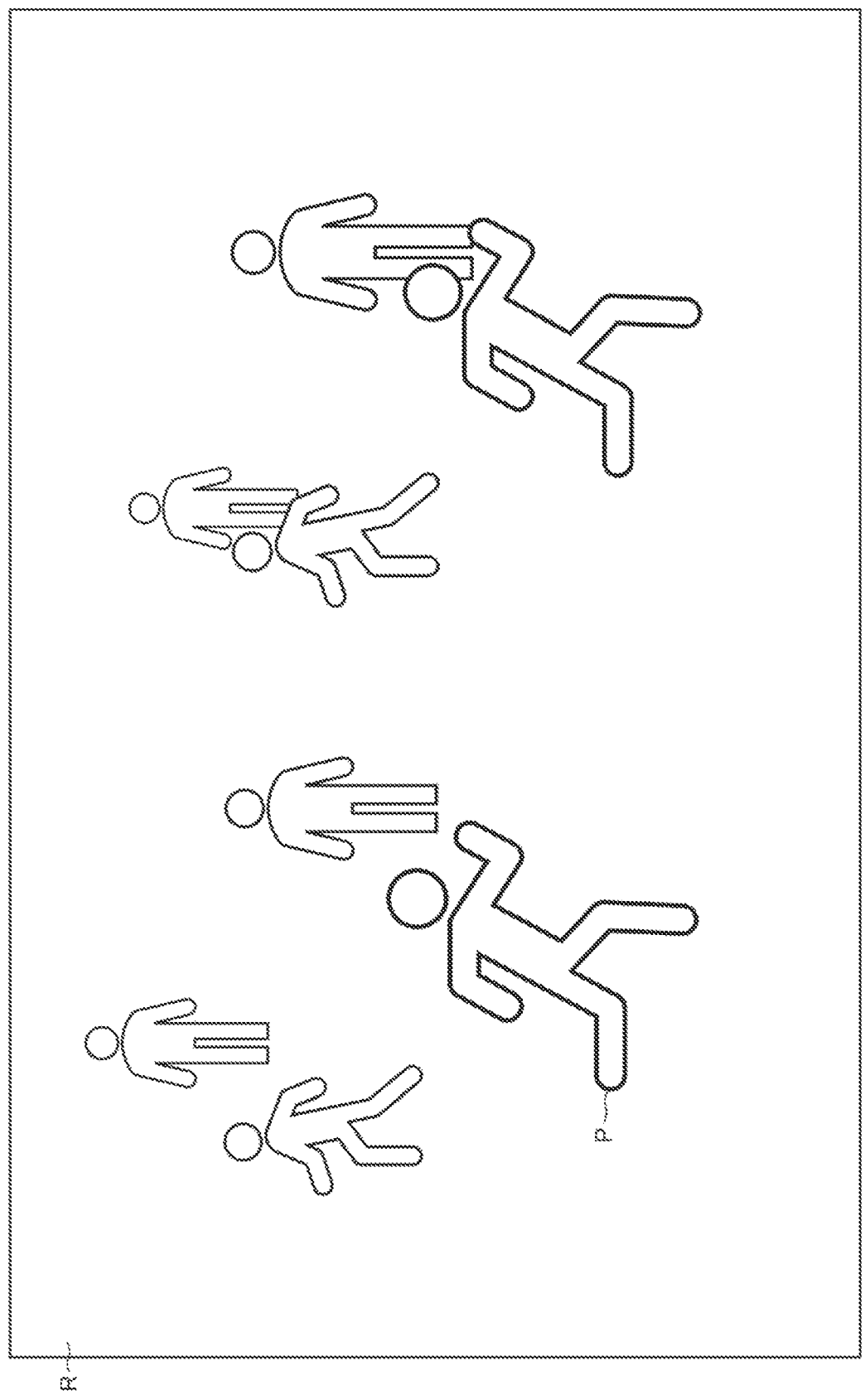
FIG. 4 is a view showing a state of processing for a captured image by a measurement device disclosed in FIG. 1.

First, the person detecting unit 11 (a detecting unit) accepts captured images of the space R captured by the camera C at constant time intervals. For example, the person detecting unit 11 accepts and temporarily stores a captured image of the space R in which a plurality of persons P exist as shown in FIG. 4. Herein, a first captured image R1 and a second captured image R2 captured with a certain time interval, which are temporally consecutive, are handled, and processing for the captured images R1 and R2 will be described. That is to say, the first captured image R1 is handled as a captured image in a first state, and the second captured image R2 captured after a predetermined time passes from the time is handled as a captured image in a second state.

Figure 5:
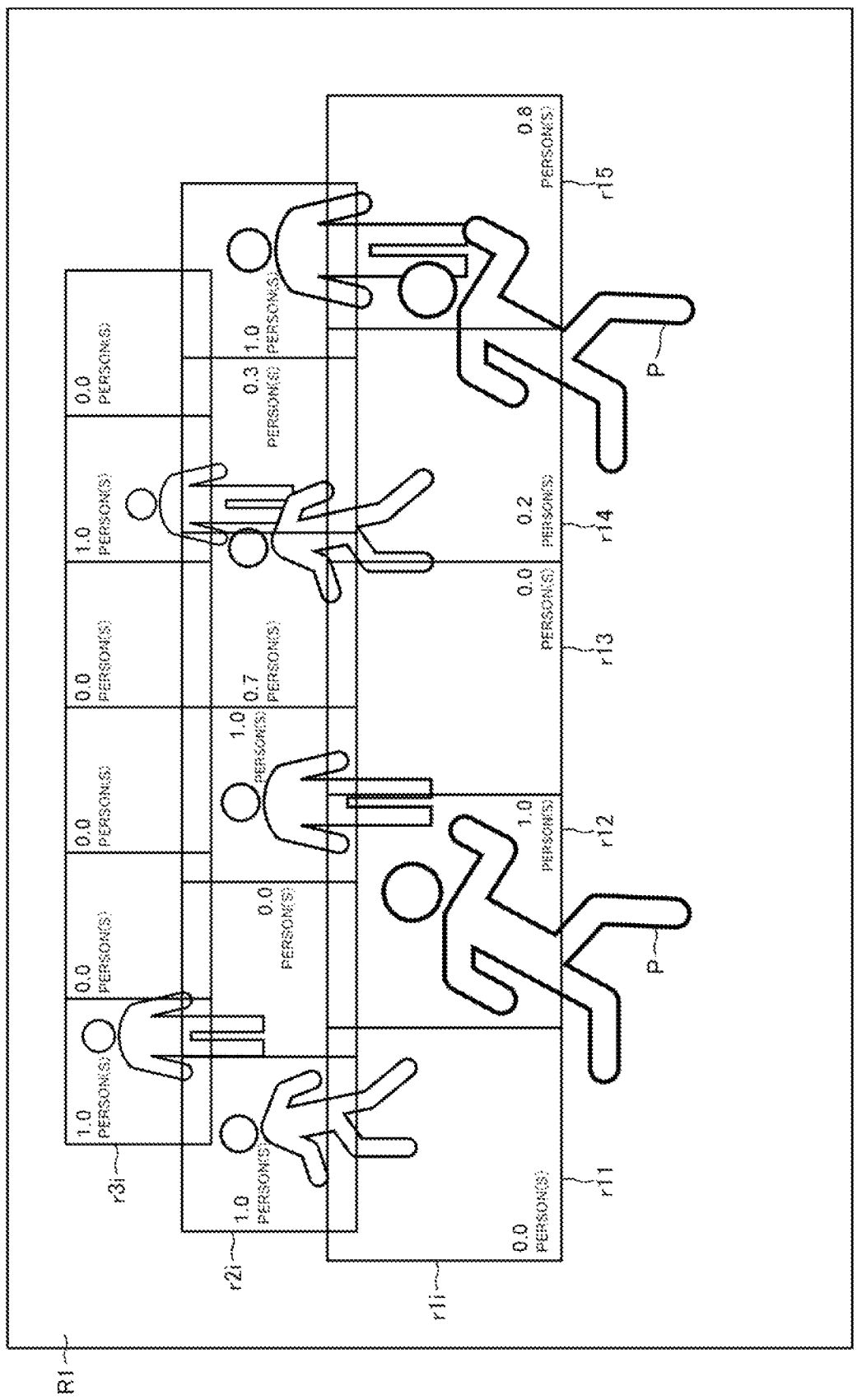
FIG. 5 is a view showing a state of processing for a captured image by the measurement device disclosed in FIG. 1.

Next, the person detecting unit 11 divides the target space R into a plurality of regions r on the first captured image R1, and detects the proportion of the person P existing in each region r. To be specific, first, as shown in FIG. 5, the regions r located at every predetermined distance from the camera C on the first captured image R1 and obtained by dividing the space R in the horizontal direction are set. At this time, the regions r are set at every distance from the camera C, in the vicinity of 100 to 200 cm in the height direction from the ground where the upper body of the person P is located. In the example of FIG. 5, regions r1$i$ (r11, r12, r13, r14, r15) located at the nearest distance and obtained by dividing into plural in the horizontal direction are set, regions r2$i$ located at the second nearest distance are set, and regions r3$i$ located at the farthest distance are set. In the following, for convenience of explanation, only the regions r1$i$ located at the shortest distance will be described. Meanwhile, the plurality of regions r in the space R may be set by any method.

Next, the person detecting unit 11 detects, for each region r set as described above, the proportion of the person P existing in the region r. In this example embodiment, the person detecting unit 11 detects the proportion of the person P existing in the region r in accordance with the proportion of the upper body of the person P shown in the region r. Therefore, the person detecting unit 11 first detects the upper body (for example, head, chest, arms) of the person P existing in the first captured image R1. As an example, the upper body of the person P is distinguished based on the shape and color of an object shown in a captured image, but may be detected by any method. Then, the person detecting unit 11 examines in what proportion the detected upper body of one person P is shown in the region r, and detects the proportion as the proportion of the person P existing in the region r. In the example of FIG. 5, the person detecting unit 11 detects regarding the respective regions r located at the closest distance that the region r11 includes 0.0 person, the region r12 includes 1.0 person, the region r13 includes 0.0 person, the region r14 includes 0.2 person, and the region r15 includes 0.8 person. The method of detecting the proportion of the person P in each region r is not limited to the above-mentioned method.

Figure 8:
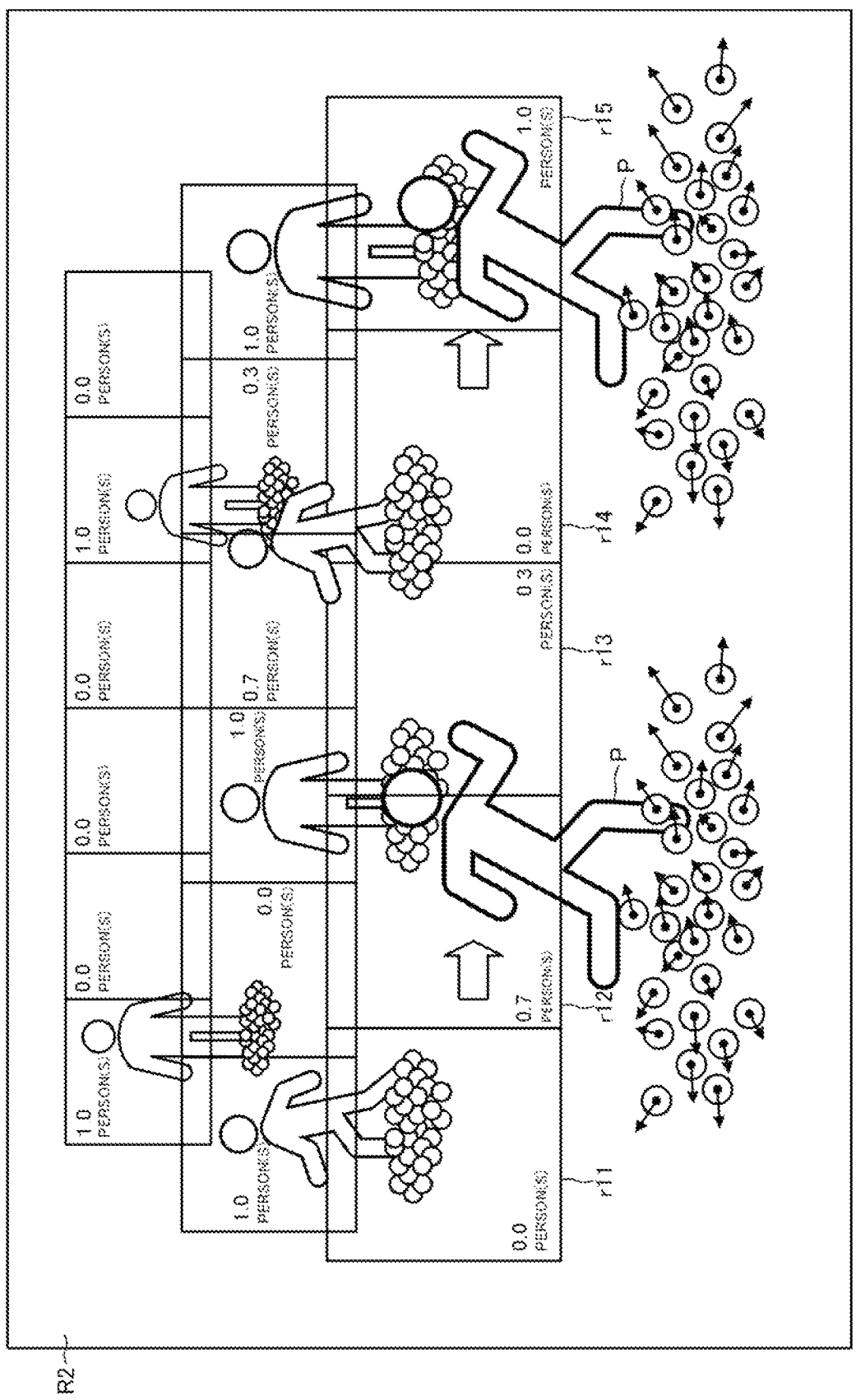
FIG. 8 is a view showing a state of processing for a captured image by the measurement device disclosed in FIG. 1.
Figure 9:
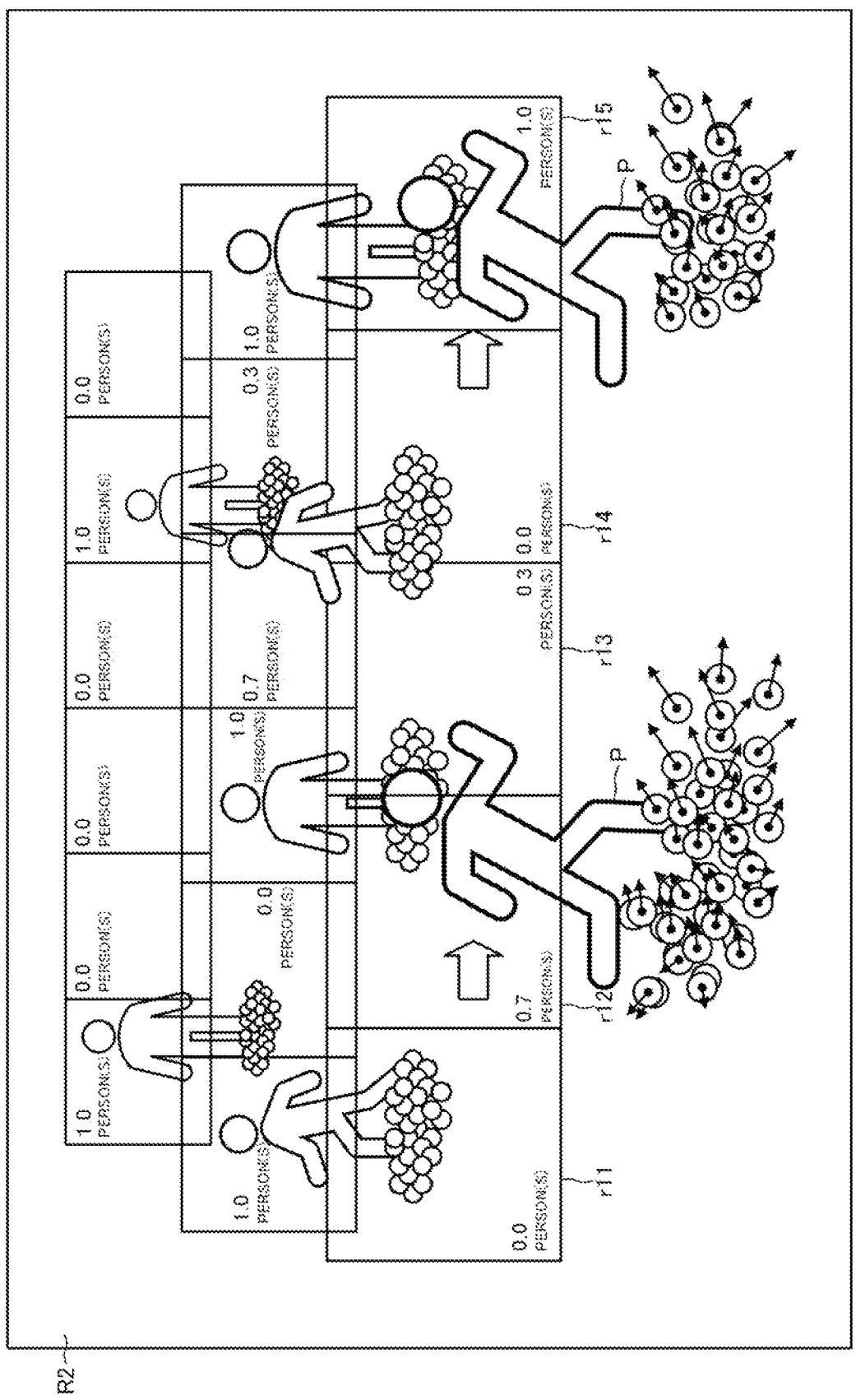
FIG. 9 is a view showing a state of processing for a captured image by the measurement device disclosed in FIG. 1.

The person detecting unit 11 detects the proportion of the person P in each region r in the same manner as described above, regarding the second captured image accepted from the camera C after a lapse of a predetermined time. At this time, positions to set the respective regions r in the second captured image R2 are identical to those in the first captured image R1. For example, upon accepting the second captured image R2 later as shown in FIGS. 8 and 9, the person detecting unit 11 detects the proportion of the person P in each region r in the second captured image R2 where the person P has moved as shown by an arrow. In the example shown by FIGS. 8 and 9, the person detecting unit 11 detects regarding the respective regions r located at the closest distance that the region r11 includes 0.0 person, the region r12 includes 0.7 person, the region r13 includes 0.3 person, the region r14 includes 0.0 person, and the region r15 includes 1.0 person.

Then, the person detecting unit 11 passes the proportion of the person P in each region r on the first captured image R1 and the proportion of the person P in each region on the second captured image R2 that are detected in the above-mentioned manner to the amount-of-activity calculating unit 12.

The amount-of-activity calculating unit 12 (a calculating unit) calculates the amount of activity in the target space R in the following manner by using the proportion of the person P in each region r of the temporally consecutive first captured image R1 and second captured image R2, that is, the captured image R1 before the person P moves and the captured image R2 after the person P moves.

Figure 6:
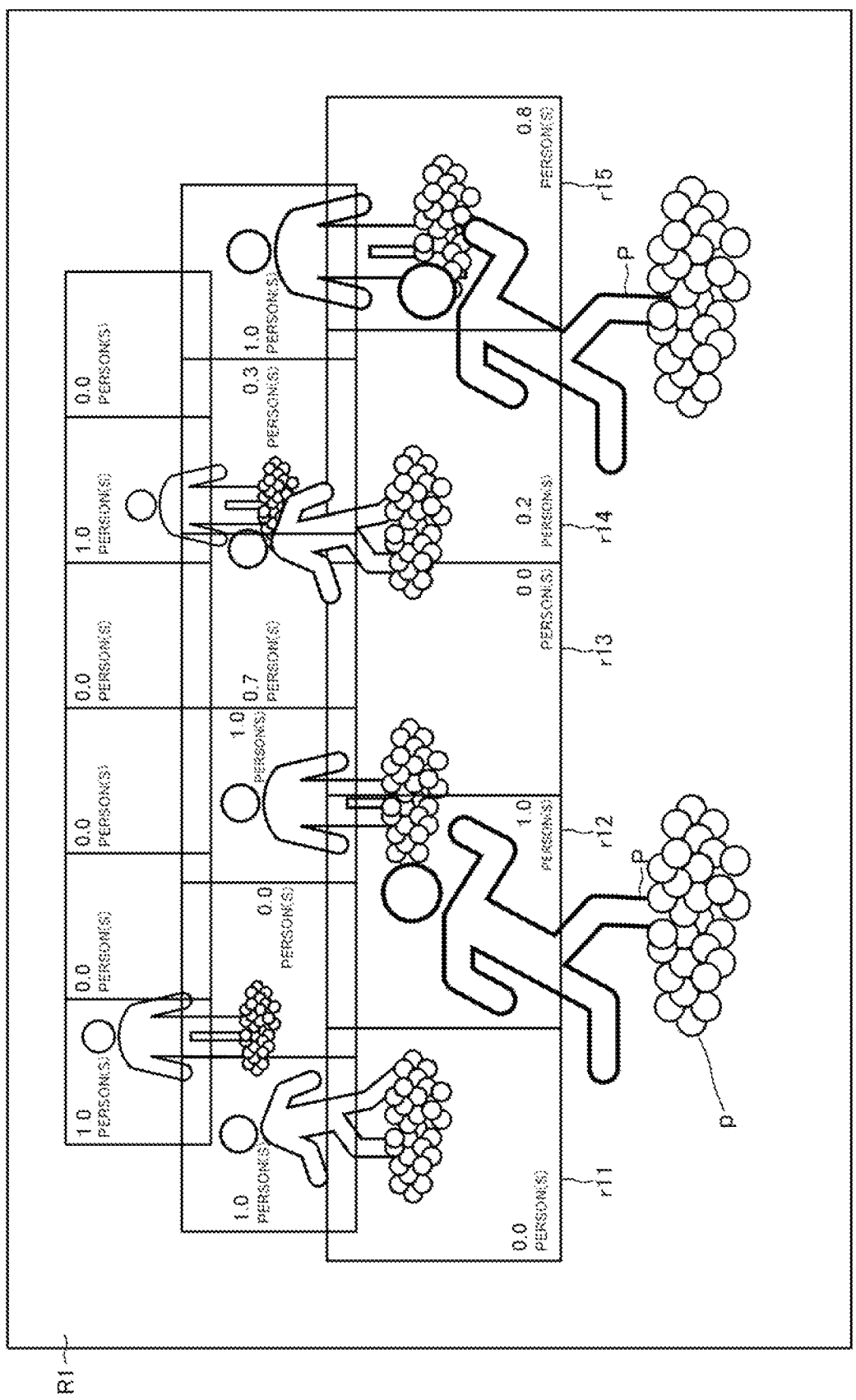
FIG. 6 is a view showing a state of processing for a captured image by the measurement device disclosed in FIG. 1.

First, the amount-of-activity calculating unit 12 sets particles p (objects) in the space R based on the proportion of the person P in each region r on the first captured image R1. At this time, the amount-of-activity calculating unit 12 sets the particles p in association with the position of each region r on the first captured image R1. For example, as shown in FIG. 6, the amount-of-activity calculating unit 12 arranges a number of particles p that corresponds to the proportion of the person P in each region r at the lower part of the region r, that is, near the ground where the region r is located. In this example embodiment, 100 particles p are set for each person P. Therefore, in the example of FIG. 6, 100 particles p that are equivalent to one person are arranged at the position of the region r12, 20 particles p that are equivalent to 0.2 person are arranged in the region r14, and 80 particles p that are equivalent to 0.8 person are arranged in the region r15. The particles p are arranged in the other regions r likewise.

Figure 7:
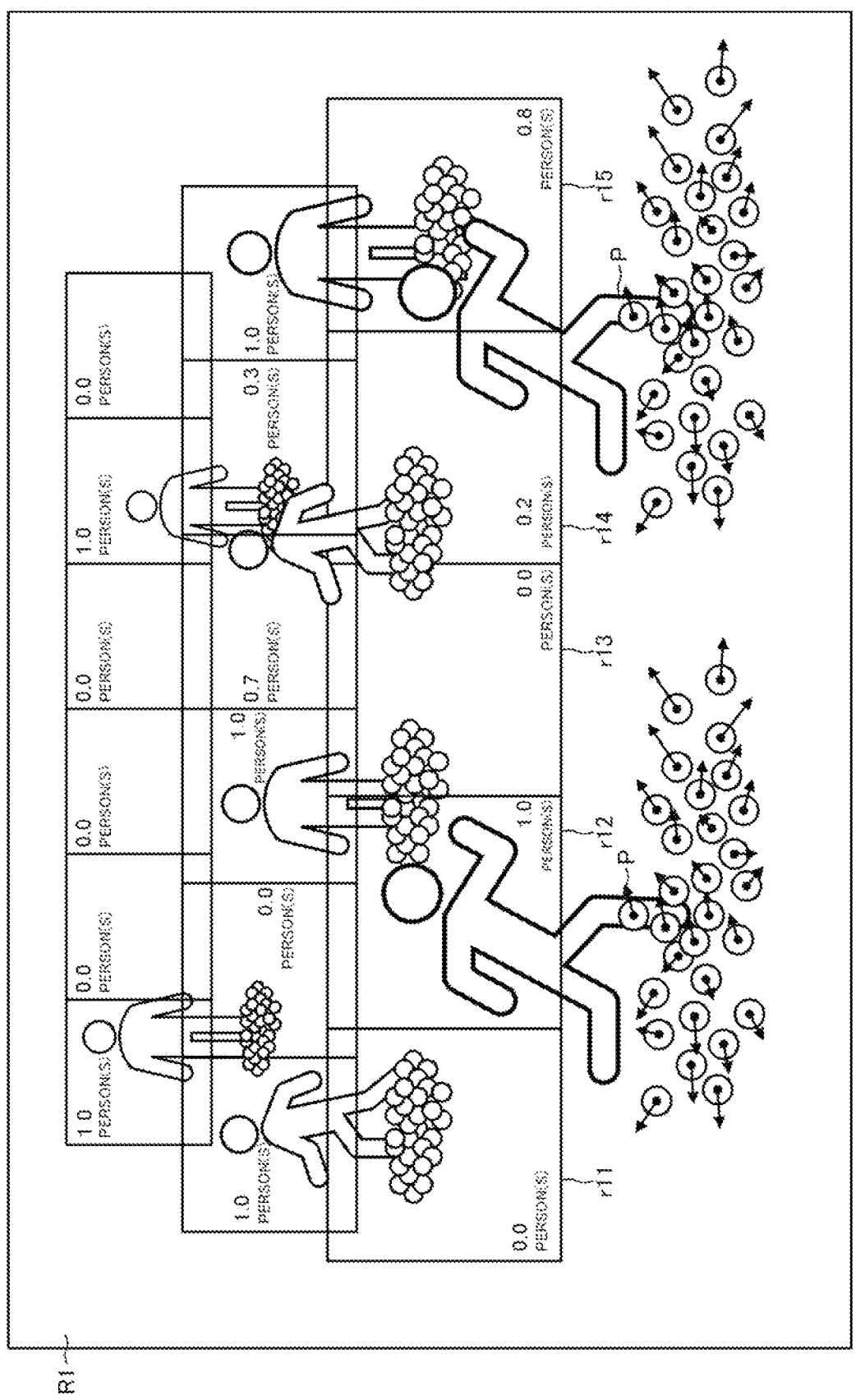
FIG. 7 is a view showing a state of processing for a captured image by the measurement device disclosed in FIG. 1.

Next, the amount-of-activity calculating unit 12 predicts the amount of movement of the particles p in each region r set on the first captured image R1. In this example embodiment, as shown by "prediction" in FIG. 10, assuming that the particle p moves based on a linear motion with constant velocity, a predetermined equation of motion or the like, the amount-of-activity calculating unit 12 predicts the position of the particle p when the second captured image R2 is captured (when a predetermined time passes), and predicts the amount of movement. At this time, in a case where the particles p set on the first captured image R1 are newly set, the amount-of-activity calculating unit 12 may set an initial value or a parameter at random and predict the amount of movement by the use of a predetermined equation of motion or the like based on the initial value or the parameter. Meanwhile, in a case where the particles p in the first captured image R1 are particles set in a prior captured image, the amount-of-activity calculating unit 12 may set the past amount of movement as an initial value or set a parameter based on the past amount of movement, and predict the amount of movement by the use of a linear motion with constant velocity or a predetermined equation of motion. An example of the amount of movement of the particle p thus predicted is shown by an arrow in FIG. 7. For convenience of explanation, FIG. 7 shows the amounts of movement of the particles p predicted only for each region r1$i$ located at the closest distance.

Next, the amount-of-activity calculating unit 12 detects the amount of movement of the particle p by the use of the predicted amount of movement of the particle p based on the proportion of the person P in the first captured image R1 and the proportion of the person P in each region r in the second captured image R2 captured after a lapse of a predetermined time described above. In the second captured image R2, in a case where the person P has moved as shown by a large arrow in FIG. 8, the proportion of the person P in each region r1$i$ located at the closest distance in the second captured image R2 is 0.0 person in r11, 0.7 person in r12, 0.3 person in r13, 0.0 person in r14, and 1.0 person in r15. Then, the amount-of-activity calculating unit 12 examines the particles p existing at a position corresponding to each region r1$i$, that is, on the ground that is the lower part of the region r1$i$. At this time, the particle p existing so as to correspond to each region r1$i$ is weighted according to the proportion of the person P in the corresponding region r1$i$. For example, as shown by "evaluation" in FIG. 10, a weighting for the particle p corresponding to the region r having a small proportion of the person P is decreased (in the lower row), and a weighting for the particle p corresponding to the region r having a large proportion of the person P is increased (in the upper row).

As an example, in the example shown in FIG. 8, the proportions of the persons P in the region r11 and the region r14 are as small as 0.0, so that weightings for the particles p corresponding to the regions r11 and r14 are minimized. On the other hand, the proportions of the persons P in the regions r12, r13 and r15 are 0.7, 0.3 and 1.0, respectively, so that weightings for the particles p corresponding to the regions r12, r13 and r15 become larger values as the proportions of the persons P increase.

Next, the amount-of-activity calculating unit 12 resets the particle p based on the weight of the particle p. Herein, in accordance with the value of the weight of the particle p, the particle p is eliminated or the particle p is increased. For example, as shown by "filter/resampling" in FIG. 10, the particle p whose weight is equal to or less than a predetermined value is eliminated (in the lower row), and the particle p whose weight is equal to or more than a predetermined value is increased by a number corresponding to the weight. Thus, the particles p predicted as shown in FIG. 8 are in a particle P arrangement state corresponding to the position of the person P after the movement as shown in FIG. 9. In other words, as shown in FIG. 9, the particles p corresponding to the regions r11 and r14 where the proportions of the persons P are 0.0 person disappear, and the particles p corresponding to the other regions r12, r13 and r15 are set to be more as the proportions of the persons P are larger.

Then, the amount-of-activity calculating unit 12 detects the predicted amount of movement of each reset particle p as the amount of movement of the particle p at the time of capturing the second captured image R2, and calculates the amount of activity from the amount of movement. At this time, the amount-of-activity calculating unit 12 calculates the amount of activity per particle p by the use of the conversion information shown in FIG. 3 stored in the conversion information storage unit 15, and the amount of activity is a value based on the amount of activity of the person P. For example, by totaling the amounts of activity of all the particles p set in the second captured image R2, the amount-of-activity calculating unit 12 can calculate as the amount of activity of all the persons P in the space R. Moreover, the amount-of-activity calculating unit 12 can calculate the amount of activity of each region r by totaling the amounts of activity of the particles p of each region r in the second captured image R2, and can calculate the amount of activity of each person P by totaling the amounts of activity of the particles p corresponding to each person P.

Figure 10:
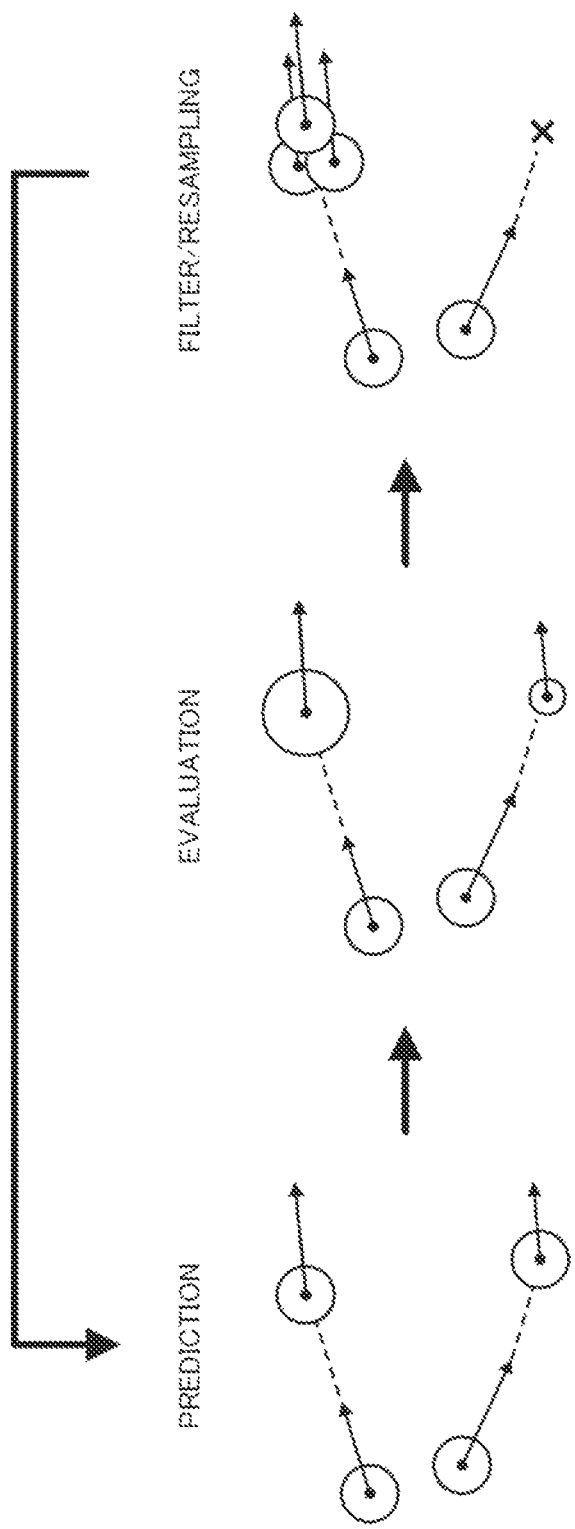
FIG. 10 is a view showing a state of processing for a captured image by the measurement device disclosed in FIG. 1.
Figure 11:
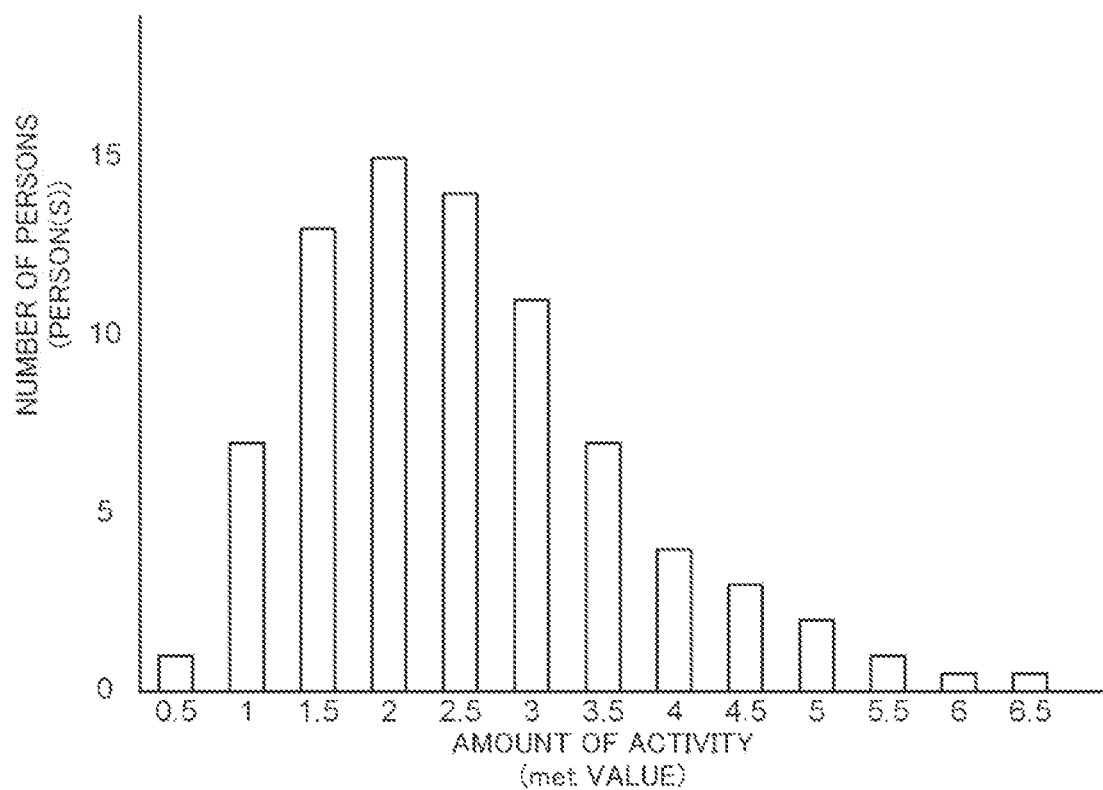
FIG. 11 is a view showing an example of information stored in the measurement device disclosed in FIG. 1.

Further, the amount-of-activity calculating unit 12 can also total the particles p for each amount of activity and calculate a histogram of the amount of activity as shown in FIG. 11. In the example of FIG. 10, 100 particles p are counted as one person. Moreover, the amount-of-activity calculating unit 12 can also calculate a value such as an average amount of activity per person in the space R by averaging the amounts of activity of the 100 particles. The amount-of-activity calculating unit 12 may calculate any value by using the amount of activity calculated from the detected amount of movement of the particle p. Moreover, the amount-of-activity calculating unit 12 does not necessarily calculate the amount of activity from the amount of movement of the particle p by the use of the conversion information representing the correspondence relationship between the moving speed and the amount of activity as shown in FIG. 3, and may be calculated by any method such as using a preset calculation formula.

In the initial state, the amount-of-activity calculating unit 12 described above does not necessarily need to set the particles p in the space R based on the proportion of the person P in each region r on the first captured image R1. In this case, the amount-of-activity calculating unit 12 may assume that an optional number of particles p are randomly arranged in advance on the space R, that is, on a captured image, and predict the amounts of movement of the particles p. After that, the amount-of-activity calculating unit 12 detects the amounts of movement of the particles p by the use of the predicted amounts of movement of the particles p arranged in advance and the proportion of the person P in each region r in the second captured image R2.

Further, the amount-of-activity calculating unit 12 then repeats prediction and detection of the amount of movement of the particle p and calculation of the amount of activity as described above. That is to say, the amount-of-activity calculating unit 12 predicts the later amount of movement of the particle p set in accordance with the proportion of the person P in each region r in the second captured image R2, detects the amount of movement of the particle p in accordance with the proportion of the person P in each region r in a subsequently captured image captured after that, and calculates the amount of activity from the amount of movement.

The outputting unit 13 (an outputting unit, a controlling unit) performs output depending on the result of calculation by the amount-of-activity calculating unit 12 described above. For example, the outputting unit 13 outputs a histogram calculated as shown in FIG. 11 to a display device, or outputs to a display device included by an output device 20 that is another information processing apparatus connected via a network. Consequently, a user who has acquired the histogram may operate equipment for air conditioning or lighting installed in the space R, and may use for behavior analysis, security, marketing, and the like of a person.

Further, the outputting unit 13 may automatically control equipment for air conditioning or lighting installed in the space R based on the result of calculation by the amount-of-activity calculating unit 12. For example, by using the calculated histogram as shown in FIG. 11, the outputting unit 13 may execute control to set air conditioning to be equal to or less than a predetermined temperature in a case where the number of persons whose amounts of activity are higher than a threshold value exceeds a predetermined number, or stop air conditioning in a case where the amount of activity is equal to or less than a threshold value.

[Operation]

Figure 12:
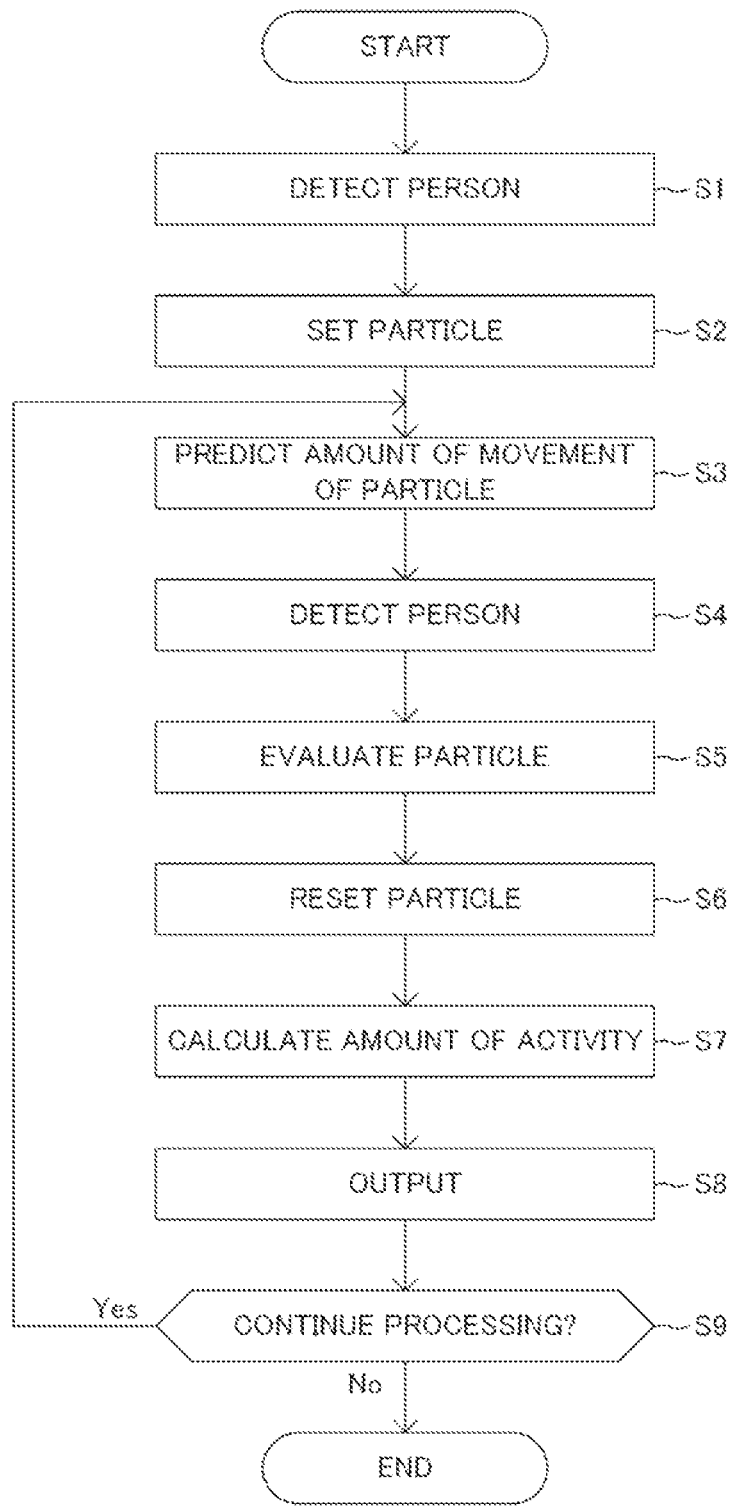
FIG. 12 is a flowchart showing a processing operation by the measurement device disclosed in FIG. 1.

Next, an operation of the above information processing system will be described with reference to a flowchart of FIG. 12. An operation of a measurement device 10 will be mainly described below.

First, upon accepting a first captured image R1 that is a captured image obtained by capturing a space R from the camera C, the measurement device 10 detects a person P in the first captured image R1 (step S1). Specifically, as shown in FIG. 5, the measurement device 10 detects, for each region r set by dividing the target space R on the first captured image R1, the proportion of the person P existing therein.

Subsequently, the measurement device 10 sets a particle p in the space R based on the proportion of the person P of each region r on the first captured image R1 (step S2). At this time, the measurement device 10 sets 100 particles p per person and sets, for each region r on the first captured image R1, more particles p in the lower part of the region r as the proportion of the person P is larger as shown in FIG. 6. The measurement device 10 may omit the process of step S1 described above and set the particles p in a state of being randomly arranged in advance at step S2.

Subsequently, the measurement device 10 predicts the amount of movement of the particle p (step S3). For example, assuming that each particle p moves based on a linear motion with constant velocity, a predetermined equation of motion, or the like, the measurement device 10 predicts the position of the particle p at the time of capturing a next captured image (after a lapse of a predetermined time) and predicts the amount of movement as shown by an arrow in FIG. 7.

Subsequently, upon accepting a second captured image R2 that is the next captured image from the camera C after a lapse of a predetermined time, the measurement device 10 detects the person P in the second captured image R2 in the same manner as described above (step S4). Then, the measurement device 10 detects, for each region r set by dividing the target space R on the second captured image R2, the proportion of the person P existing therein in the same manner as described above.

Subsequently, the measurement device 10 evaluates the amount of movement of the particle p predicted as described above based on the proportion of the person P of each region r on the second captured image R2 (step S5). To be specific, the measurement device 10 gives less weight to the particle p associated with the region r where the proportion of the person P is smaller, and gives more weight to the particle p associated with the region r where the proportion of the person P is larger. Then, the measurement device 10 resets the particle p based on the weight of the particle p (step S6). Herein, the measurement device 10 eliminates the particle p or increases the particle p in accordance with the value of the weight of the particle p as shown in FIGS. 8 and 9.

Subsequently, the measurement device 10 detects the predicted amount of movement of each particle p as the amount of movement of the particle p at a moment of capturing the second captured image R2, and calculates the amount of activity from the amount of movement (step S7). Then, the measurement device 10 calculates a histogram of the amount of activity as shown in FIG. 11, and calculates a value based on the amount of activity of a preset format desired by the user.

Subsequently, the measurement device 10 outputs the calculated value based on the amount of activity to the output device 20, and controls various kinds of equipment in accordance with the calculated value (step S8). After that, in the case of continuing the processing (step S9, Yes), the measurement device 10 predicts the amount of movement of the reset particle p by using the second captured image R2 in the same manner as described above, determines the amount of movement of the particle p by using a subsequent captured image, and calculates a value based on the amount of activity (return to step S3).

As described above, according to the present invention, for each region obtained by dividing the space R, the amount of movement of a person existing therein is detected based on the proportion of the person, and the amount of activity of the person is calculated. Therefore, it is possible to detect the amount of movement of a person without tracing the person, and it is possible to detect the amount of activity of the person with high accuracy by a simple method. As a result, it becomes possible to easily use information of the amount of activity of a person for various purposes.

Although a case of detecting the proportion of the person P existing in each region r obtained by dividing the target space R into a plurality of regions by the use of a captured image obtained by capturing the space R with the camera C is illustrated as an example above, the detection method is not limited to using a captured image and may be any method. For example, by placing pressure sensors at predetermined intervals on the floor of the space R and acquiring a detection value detected when the person P steps the pressure sensor, it is possible to detect the proportion of the person P of each region r in the space R.

Second Example Embodiment

Figure 13:
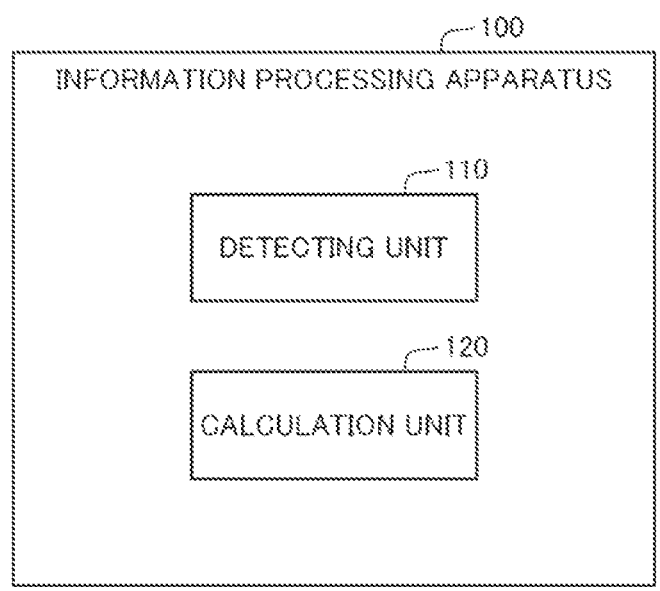
FIG. 13 is a block diagram showing a configuration of an information processing apparatus in a second example embodiment of the present invention.

Next, a second example embodiment of the present invention will be described with reference to FIG. 13. FIG. 13 is a block diagram showing a configuration of an information processing apparatus in the second example embodiment. In this example embodiment, the overview of the configuration of the measurement device described in the first example embodiment is illustrated.

As shown in FIG. 13, an information processing apparatus 100 in this example embodiment includes: a detecting unit 110 configured to detect a proportion of an existing person for each predetermined region; and a calculating unit 120 configured to, based on the proportion of the person of each predetermined region, calculate a value based on an amount of activity of the person.

The detecting unit 110 and the calculating unit 120 mentioned above may be structured by execution of a program by an arithmetic logic unit of the information processing apparatus 100, or may be structured by an electronic circuit.

Then, the information processing apparatus 100 thus configured operates to execute processing of: detecting a proportion of a person existing for each predetermined region; and, based on the proportion of the person of each predetermined region, calculating a value based on an amount of activity of the person.

According to the present invention, it is possible to, based on the proportion of an existing person for each region obtained by dividing a space, detect the amount of movement of the person, and calculate the amount of activity of the person. As a result, it is possible to acquire the amount of activity of a person in a predetermined space with ease and with high accuracy, and use for various purposes is facilitated.

<Supplementary Notes>

The whole or part of the example embodiments disclosed above can be described as the following supplementary notes. Hereinafter, the overview of the configurations of the information processing system, the information processing method and the program will be described. Meanwhile, the present invention is not limited to the following configurations.

(Supplementary Note 1)

An information processing apparatus comprising:
a detecting unit configured to detect a proportion of an existing person for each predetermined region; and
a calculating unit configured to, on a basis of the proportion of the person in each predetermined region, calculate a value based on an amount of activity of the person.

(Supplementary Note 2)

The information processing apparatus according to Supplementary Note 1, wherein the calculating unit is configured to set a predetermined object corresponding to the proportion of the person of each predetermined region and detect an amount of movement of the object, and calculate the value based on the amount of activity of the person on a basis of the amount of movement of the object.

(Supplementary Note 3)

The information processing apparatus according to Supplementary Note 1 or 2, wherein the calculating unit is configured to set a number of objects corresponding to the proportion of the person of each predetermined region and detect an amount of movement of the object, and calculate the value based on the amount of activity of the person on a basis of the amount of movement of the object.

(Supplementary Note 4)

The information processing apparatus according to Supplementary Note 2 or 3, wherein:
the detecting unit is configured to detect the proportion of the existing person for each predetermined region in each of a first state and a second state of the person that are temporally consecutive; and
the calculating unit is configured to, on a basis of the proportion of the person of each predetermined region in each of the first state and the second state, set the object corresponding to the proportion of the person and detect the amount of movement of the object.

(Supplementary Note 5)

The information processing apparatus according to Supplementary Note 4, wherein the calculating unit is configured to predict the amount of movement of the object corresponding to the proportion of the person of each predetermined region in the first state, and detect the amount of movement of the object on a basis of the predicted amount of movement of the object and the proportion of the person of each predetermined region in the second state.

(Supplementary Note 6)

The information processing apparatus according to Supplementary Note 5, wherein the calculating unit is configured to weight the object whose amount of movement has been predicted on a basis of the proportion of the person of each predetermined region in the second state, and calculate the value based on the amount of activity of the person on a basis of the weighted amount of movement of the object.

(Supplementary Note 7)

The information processing apparatus according to Supplementary Note 5 or 6, wherein the calculating unit is configured to predict the amount of movement of a number of objects corresponding to the proportion of the person of each predetermined region in the second state, and calculate the value based on the amount of activity of the person on a basis of the predicted amount of movement of the object.

(Supplementary Note 8)

The information processing apparatus according to any of Supplementary Notes 1 to 7, comprising an outputting unit configured to output the calculated value based on the amount of activity of the person.

(Supplementary Note 9)

The information processing apparatus according to any of Supplementary Notes 1 to 8, comprising a controlling unit configured to perform control of predetermined equipment on a basis of the calculated value based on the amount of activity of the person.

(Supplementary Note 10)

An information processing method comprising:
detecting a proportion of an existing person for each predetermined region; and
on a basis of the proportion of the person in each predetermined region, calculating a value based on an amount of activity of the person.

(Supplementary Note 10.1)

The information processing method according to Supplementary Note 10, wherein a predetermined object corresponding to the proportion of the person of each predetermined region is set and an amount of movement of the object is detected, and the value based on the amount of activity of the person is calculated on a basis of the amount of movement of the object.

(Supplementary Note 10.2)

The information processing method according to Supplementary Note 10 or 10.1, wherein a number of objects corresponding to the proportion of the person of each predetermined region is set and an amount of movement of the object is detected, and the value based on the amount of activity of the person is calculated on a basis of the amount of movement of the object.

(Supplementary Note 10.3)

The information processing method according to Supplementary Note 10.1 or 10.2, wherein:

the proportion of the existing person for each predetermined region in each of a first state and a second state of the person that are temporally consecutive is detected; and on a basis of the proportion of the person of each predetermined region in each of the first state and the second state, the object corresponding to the proportion of the person is set and the amount of movement of the object is detected.

(Supplementary Note 10.4)

The information processing method according to claim 10.3, wherein the amount of movement of the object corresponding to the proportion of the person of each predetermined region in the first state is predicted, and the amount of movement of the object is detected on a basis of the predicted amount of movement of the object and the proportion of the person of each predetermined region in the second state.

(Supplementary Note 10.5)

The information processing method according to Supplementary Note 10.4, wherein the object whose amount of movement has been predicted is weighted on a basis of the proportion of the person of each predetermined region in the second state, and the value based on the amount of activity of the person is calculated on a basis of the weighted amount of movement of the object.

(Supplementary Note 10.6)

The information processing method according to Supplementary Note 10.4 or 10.5, wherein the amount of movement of a number of objects corresponding to the proportion of the person of each predetermined region in the second state is predicted, and the value based on the amount of activity of the person is calculated on a basis of the predicted amount of movement of the object.

(Supplementary Note 10.7)

The information processing method according to any of Supplementary Notes 10 to 10.6, comprising outputting the calculated value based on the amount of activity of the person.

(Supplementary Note 10.8)

The information processing method according to any of Supplementary Notes 10 to 10.7, comprising performing control of predetermined equipment on a basis of the calculated value based on the amount of activity of the person.

(Supplementary Note 11)

A computer program comprising instructions for causing an information processing apparatus to realize:

a detecting unit configured to detect a proportion of an existing person for each predetermined region; and a calculating unit configured to, on a basis of the proportion of the person in each predetermined region, calculate a value based on an amount of activity of the person.

The abovementioned program can be stored by the use of various types of non-transitory computer-readable mediums and supplied to a computer. A non-transitory computer-readable medium includes various types of tangible storage mediums. A non-transitory computer-readable medium includes, for example, a magnetic recording medium (for example, a flexible disk, a magnetic tape, a hard disk drive), a magnetooptical recording medium (for example, a magnetooptical disk), a CD-ROM (Read Only Memory), a CD-R, a CD-R/W, a semiconductor memory (for example, a mask ROM, a PROM (Programmable ROM), an EPROM (Erasable PROM), a flash memory, and a RAM (Random Access Memory). Moreover, a program may be supplied to a computer by various types of transitory computer-readable mediums. A transitory computer-readable medium includes, for example, an electric signal, an optical signal, and an electromagnetic wave. A transitory computer-readable medium can supply a program to a computer via a wired communication channel such as an electric cable and an optical fiber or via a wireless communication channel.

Although the present invention has been described above with reference to the example embodiments and so on, the present invention is not limited to the example embodiments. The configurations and details of the present invention can be changed in various manners that can be understood by one skilled in the art within the scope of the present invention.

The present invention is based upon and claims the benefit of priority from Japanese patent application No. 2018-178790, filed on Sep. 25, 2018, the disclosure of which is incorporated herein in its entirety by reference.

DESCRIPTION OF NUMERALS 10 measurement device
11 person detecting unit
12 amount-of-activity calculating unit
13 outputting unit
15 conversion information storing unit
20 output device
100 information processing apparatus
110 detecting unit
120 calculating unit
C camera
P person
p particle
R space
r region
R1 first captured image
R2 second captured image

What is claimed is:

1. An information processing apparatus comprising:
a memory storing instructions; and
at least one processor configured to execute the instructions, the instructions comprising:
detecting a proportion of a person for each predetermined region in each of a first state and a second state of the person, the first state and the second state being temporally consecutive; and
on a basis of the proportion of the person in each predetermined region in the first state, setting a number of objects corresponding to the proportion of the person and predicting an amount of movement of each of the objects, weighting the object whose amount of movement has been predicted on a basis of the proportion of the person of each predetermined region in the second state, resetting the objects by eliminating the object whose weight value is equal to or less than a predetermined value and increasing the object whose weight value is equal to or more than the predetermined value by a number corresponding to the weight value, and calculating a value based on an amount of activity of the person on a basis of the amount of movement of the reset objects.

2. The information processing apparatus according to claim 1, wherein the instructions comprises outputting the calculated value based on the amount of activity of the person.

3. The information processing apparatus according to claim 1, wherein the instructions comprises performing control of predetermined equipment on a basis of the calculated value based on the amount of activity of the person.

4. An information processing method comprising:
  detecting a proportion of a person for each predetermined region in each of a first state and a second state of the person, the first state and the second state being temporally consecutive; and
  on a basis of the proportion of the person in each predetermined region in the first state, setting a number of objects corresponding to the proportion of the person and predicting an amount of movement of each of the objects, weighting the object whose amount of movement has been predicted on a basis of the proportion of the person of each predetermined region in the second state, resetting the objects by eliminating the object whose weight value is equal to or less than a predetermined value and increasing the object whose weight value is equal to or more than the predetermined value by a number corresponding to the weight value, and calculating a value based on an amount of activity of the person on a basis of the amount of movement of the reset objects.

5. The information processing method according to claim 4, comprising outputting the calculated value based on the amount of activity of the person.

6. The information processing method according to claim 4, comprising performing control of predetermined equipment on a basis of the calculated value based on the amount of activity of the person.

7. A non-transitory computer-readable storage medium having a computer program stored thereon, the computer program comprising instructions for causing an information processing apparatus to execute:
  detecting a proportion of a person for each predetermined region in each of a first state and a second state of the person, the first state and the second state being temporally consecutive; and
  on a basis of the proportion of the person in each predetermined region in the first state, setting a number of objects corresponding to the proportion of the person and predicting an amount of movement of each of the objects, weighting the object whose amount of movement has been predicted on a basis of the proportion of the person of each predetermined region in the second state, resetting the objects by eliminating the object whose weight value is equal to or less than a predetermined value and increasing the object whose weight value is equal to or more than the predetermined value by a number corresponding to the weight value, and calculating a value based on an amount of activity of the person on a basis of the amount of movement of the reset objects.

* * * * *